(12) United States Patent
Archer et al.

(10) Patent No.: US 8,945,504 B2
(45) Date of Patent: Feb. 3, 2015

(54) NANOSTRUCTURED METAL OXIDES COMPRISING INTERNAL VOIDS AND METHODS OF USE THEREOF

(71) Applicant: Cornell University, Ithaca, NY (US)

(72) Inventors: Lynden A. Archer, Ithaca, NY (US); Xiong Wen Lou, Singapore (SG)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 13/721,440

(22) Filed: Dec. 20, 2012

(65) Prior Publication Data
US 2013/0130109 A1 May 23, 2013

Related U.S. Application Data

(63) Continuation of application No. 12/303,668, filed as application No. PCT/US2007/070553 on Jun. 6, 2007, now abandoned.

(60) Provisional application No. 60/804,031, filed on Jun. 6, 2006.

(51) Int. Cl.
*B32B 1/00* (2006.01)
*B05D 7/00* (2006.01)
*H01M 4/48* (2010.01)
(Continued)

(52) U.S. Cl.
CPC ............... *H01M 4/48* (2013.01); *C01B 33/12* (2013.01); *C01G 1/02* (2013.01); *C01G 19/02* (2013.01); *H01M 4/366* (2013.01); *H01M 4/485* (2013.01); *B82Y 30/00* (2013.01); *C01P 2004/64* (2013.01); *C01P 2006/40* (2013.01); *H01G 9/2027* (2013.01); *H01M 10/0525* (2013.01);
(Continued)

(58) Field of Classification Search
None
See application file for complete search history.

(56) References Cited

U.S. PATENT DOCUMENTS

| 2003/0190475 | A1* | 10/2003 | Carpenter et al. | ............ 428/403 |
| 2005/0082521 | A1* | 4/2005 | Torimoto et al. | ............... 257/17 |
| 2006/0102871 | A1* | 5/2006 | Wang et al. | ............ 252/62.51 R |

OTHER PUBLICATIONS

Template-Free Synthesis of SnO2 Hollow Nanostructures With High Lithium Storage Capacity. Published in Aug. 2006. Lou et al.*

(Continued)

*Primary Examiner* — Melvin C Mayes
*Assistant Examiner* — Colette Nguyen
(74) *Attorney, Agent, or Firm* — Ascenda Law Group PC

(57) ABSTRACT

The present invention relates to nano structures of metal oxides having a nanostructured shell (or wall), and an internal space or void. Nanostructures may be nanoparticles, nanorod/belts/arrays, nanotubes, nanodisks, nanoboxes, hollow nanospheres, and mesoporous structures, among other nanostructures. The nanostructures are composed of polycrystalline metal, oxides such as $SnO_2$. The nanostructures may have concentric walls which surround the internal space of cavity. There may be two or more concentric shells or walls. The internal space may contain a core such ferric oxides or other materials which have functional properties. The invention also provides for a novel, inexpensive, high-yield method for mass production of hollow metal oxide nanostructures. The method may be template free or contain a template such as silica. The nanostructures prepared by the methods of the invention provide for improved cycling performance when tested using rechargeable lithium-ion batteries.

30 Claims, 8 Drawing Sheets

(51) Int. Cl.

| | |
|---|---|
| *C01B 33/12* | (2006.01) |
| *C01G 1/02* | (2006.01) |
| *C01G 19/02* | (2006.01) |
| *H01M 4/36* | (2006.01) |
| *H01M 4/485* | (2010.01) |
| *B82Y 30/00* | (2011.01) |
| *H01G 9/20* | (2006.01) |
| *H01M 10/0525* | (2010.01) |
| *H01M 4/02* | (2006.01) |

(52) U.S. Cl.
CPC ... *H01M2004/021* (2013.01); *H01M 2004/027* (2013.01); *Y02E 60/122* (2013.01)

USPC ............. 423/592.1; 428/402.2; 428/403; 428/404; 424/489; 252/62.56; 429/213

(56) References Cited

OTHER PUBLICATIONS

General Synthetic Route Toward Finctional Hollow Spheres With Double Shelled Structured. Published in Sep. 2005. Yang et al.*
Simple Synthgesis of Hollow Tin Oxide Microspheres and Their Application to Lithium _ION Battery Anodes. by Sangjin Han et al. Advanced Functional Materials. Sep. 22, 2005.*

* cited by examiner

Figures 7A-B
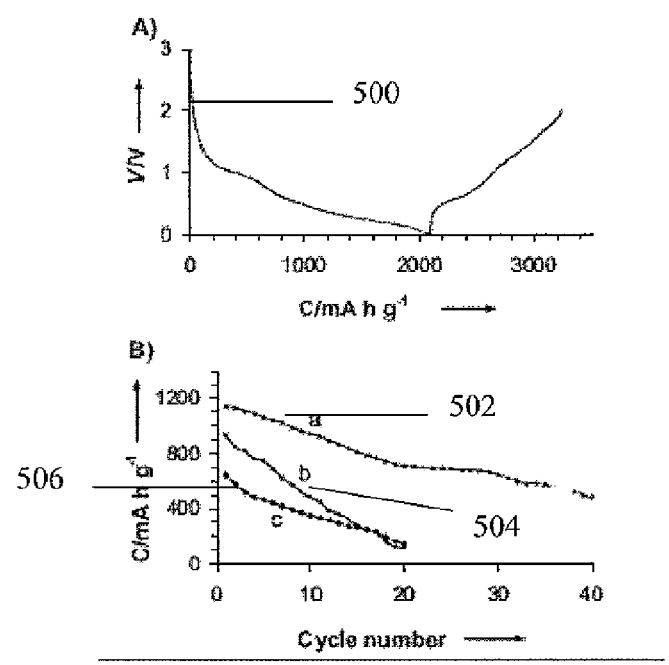

NANOSTRUCTURED METAL OXIDES COMPRISING INTERNAL VOIDS AND METHODS OF USE THEREOF

PRIORITY CLAIM

The present application is a continuation of U.S. patent application Ser. No. 12/303,668, which is a 371 national stage of PCT/US2007/070553 filed on Jun. 6, 2007, which claims priority to U.S. Provisional Patent Application No. 60/804,031 filed on Jun. 6, 2006, the contents of each of which are hereby incorporated by reference in their entirety.

STATEMENT OF GOVERNMENT RIGHTS

This invention was made with Government support under contract number DMR 0404278, awarded by the National Science Foundation. The government has certain rights in this invention.

FIELD OF INVENTION

The present invention relates to nanostructures and more particularly to nanostructures comprising nanostructured metal oxide shells enclosing internal voids, as well as methods for making and using the same.

BACKGROUND

Recently, hollow inorganic micro- and nanostructures have attracted considerable attention because of their promising applications as nanoscale chemical reactors, catalysts, drug delivery earners, semiconductors, and photonic building blocks. X. W, Lou, C. Yuan, Q. Zhang, L. A. Archer, *Angew. Chem, Int. Ed.* 2006, 45, 3825. In particular, nanostructures comprising metal oxides may be used as semiconductors in applications such as gas sensors and lithium rechargeable batteries. Y. Wang, X. Jiang, Y, Xia, *J. Am. Chem, Soc.* 2003, 725, 16176; M. Law, H, Kind, B. Messer, P. Kim, F, Yang, *Angew. Chem. Int. Ed.* 2002, 41, 2405; Y. Idota, T, Kubota, A, Matsufuji, Y. Maekawa, T. Miyasaka, *Science,* 1997, 276, 1395. However, although metal oxides (for example, tin oxide ($SnO_2$)) generally have a much higher theoretical specific lithium storage capacity area than more traditionally used materials such as graphite, the large volume changes in metal oxide nanostructures during charging/discharging processes result m poor cyclability, thus limiting their use in such applications. S. Han, B. Jang,. T. Kim, S. M. Oh, T. Hyeon, *Adv. Funct. Mater,* 2005, 15, 1845; K. T. Lee, Y. S. Jung, S. M. Oh, *J. Am. Chem. Sac.* 2003, 125, 5652; Y. Wang, H. C. Zeng, J. Y. Lee. *Adv. Mater,* 2006, 18, 645, One possible strategy to mitigate this problem and further enhance structural stability is to use hollow nanostructures. Such hollow nanostructures have higher surface to volume ratios which allow for greater charge capacities than solid nanostructures. Hollow nanostructures may be designed in various shapes and sizes, and commonly include nanoparticles, nanorods/belts/arrays, nanotubes, nanocylinders, nanococoons, nanodisks, nanoboxes, nanospheres, among others.

At present, there exist numerous methods for the preparation of hollow metal oxide nanostructures. One approach involves the use of various removable or sacrificial templates, including, for example, monodispersed silica, carbon or polymer latex spheres, reducing metal nanoparticles, and even emulsion droplets/micelles and gas bubbles. Q. Peng, Y. Dong, Y. Li, Angew. *Chem. Inl. Ed.* 2003, 42, 3027-3030. Although conceptually simple and versatile, such methods are often burdened with the challenge of uniformly depositing metal oxides (or their precursors) on templates, a problem which has traditionally been dealt by prior surface modification, itself a tedious process, M. Yang, J. Ma, C. Zhang, Z. Yang, Y. Lu, Angew. *Chem. Int. Ed.* 2005, 44, 6727. Other templating methods such as templating sol-gel precursors with colloidal crystals or their replicas (often called the "lost-wax approach") result in amorphous and structurally fragile nanostructures upon crystallization at high temperatures and upon template removal. Z, Zhong, Y. Yin, B. Gates. Y. Xia, *Adv. Mater,* 2000, 12, 206-209.

Other approaches, which are template free, employ mechanisms such as corrosion-based inside out evacuation and the nanoparticle Kirkendalf effect. Y. D. Yin, R. M. Rioux, C. K, Erdonmez, S. Hughes, G. A. Somorjai, A. P. Alivisatos, *Science* 2004, 304, 711. However, many such existing methods for the production of nanostructures are often cumbersome involving multiple steps that are often difficult to control, and are cost-prohibitive which prevent them from being used in large-scale applications. Moreover, many of these existing methods also result in poor yields of mono-disperse, hollow nanostructures, producing mixed hollow and solid nanostructures, or nanostructures with large-size distributions.

Thus, there exists a need for improved hollow metal oxide nanostructures comprising a relatively high surface to volume ratio (and thus a large number of potential active sites) and physical stability. There also exists a need for viable industrially sealeable methods of producing such hollow metal oxide nanostructures at low cost, high yields, narrow-size dispersions, geometric stability and homogeneous morphologies.

SUMMARY OF THE INVENTION

In one aspect, the present invention relates to nanostructures of metal oxides, comprising a nanostructured shell defining an internal space, internal cavity, or "internal void." The nanostructures may be nanoparticles, nanorods/belts/arrays, nanotubes, nanocylinders, nanodisks, nanoboxes, nanospheres, nanococoons, nanospindles, among other nanostructures. In one embodiment, the nanostructure comprises a metal oxide nanosphere comprising an outer shell defining a completely hollow cavity. In another embodiment, the nanostructure comprises a inner hollow cavity comprising an internal core. In yet another embodiment, the nanostructures comprise two or more nanostructured metal oxide concentric shells surrounding an inner cavity, while in another embodiment, such nanostructured metal oxide concentric shells surrounding the inner space are in turn separated by intervening spaces. In yet another embodiment, the nanostructures may comprise a plurality of pores in one or more of the nanostructured walls. In other embodiments, the nanostructures comprise additional materials in the inner space, for example, materials bearing magnetic or electrical properties, for example ferric oxides including, but not limited to, $Fe_2O_3$, $Fe_3O_4$, $CoFe_2O_4$, as well as other metal oxides like $Co_3O_4$, ZnO, CuO, $Cu_2O$, or even metal sulfide semiconductors like CdS, ZnS, etc. Materials with other functional properties, including noble metals, like Au, Ag, Ft, Pd, etc., may also be enclosed within the inner space of the nanostructures of the invention. When the nanostructures are synthesized using templates comprising silica, latex, carbon, or gels, the inner space of the nanostructure may comprise cores of varying sizes of the template material used. In preferred embodiments, the nanostructures are made of tin oxides, but may also comprise oxides of titanium, zirconium, boron, aluminum, germanium, indium, gallium, hafnium, silicon, vanadium, or tantalum, zinc, copper, iron, nickel, copper and combinations thereof.

In another aspect, the present invention is directed to novel inexpensive, viable, high-yield methods for large-scale and industrial mass production of such hollow metal oxide nanostructures. In one embodiment, the invention comprises a template-free "one-pot" method, based on an inside-out Oswald ripening mechanism. This method comprises hydrothermal treatment of a metal-oxide precursor in a mixed solvent, usually a polar solvent in and water, and the mediation of general ionic and non-ionic surfactants, polymers, or crystal modifiers such as urea-based compounds at temperatures above about 140° C. and up to about 200° C. that allow for high-yield mass production of hollow metal oxide nanostructures with controllable sizes in the range of 200.0-500.0 nm.

In yet another aspect, the invention is drawn to a novel hydrothermal shell-by-shell templating strategy suitable for the preparation of polycrystalline monodisperse metal oxide hollow nanostructures with nanostructured metal oxide shells. Unlike existing methods, the hydrothermal shell-by-shell templating method of the invention requires no prior surface modification of the template, making this method both easier to use and less costly than existing methods. In one embodiment, the metal oxide hollow nanostructures are multi-shelled which leads to greater physical stability. In another embodiment, these single or multi-shelled nanostructures are functionalized with other functional nanoparticles (e.g., materials with magnetic properties, materials with good heat and electrical conductivity properties, etc.). The deposition protocol taught by the invention can be applied to a variety of template materials, including both silica and non-silica templates, and to templates having varying shapes, sizes and symmetries. In one embodiment, the nanostructures produced by tins method may be coated with additional magnetic or semiconductor materials.

BRIEF DESCRIPTION OF THE DRAWINGS

Certain embodiments of the present invention are illustrated by the accompanying figures. It should be understood that the figures are not necessarily to scale and that details not necessary for an understanding of the invention or that render other details difficult to perceive may be omitted. It should be understood, of course, that the invention is not necessarily limited to the particular embodiments illustrated herein.

FIG. 7A depicts a first cycle charge-discharge curve for $SnO_2$ hollow nanospheres. FIG. 7B illustrates the comparative cycling performance of various nanostructures.

DETAILED DESCRIPTION

The hollow nanostructures of the present invention comprise one or more polycrystalline metal oxide nanostructured shells enclosing an inner cavity or "internal void." As used herein, the terms cavity and void are interchangeable. Various metal oxides may be employed in the invention, including, but not restricted to oxides of titanium, zirconium, boron, aluminum, germanium, indium, gallium, hafnium, silicon, vanadium, tin, tantalum, iron, nickel, cobalt, zinc, copper and combinations thereof. In preferred embodiments, the metal oxides may be tin oxide ($SnO_2$), titanium dioxide ($TiO_2$), and zirconium oxide ($ZrO_2$). More preferably, the metal oxide is $SnO_2$.

The hollow nanostructures as taught by the invention exhibit various configurations, including, but not limited to, nanoparticles, nanorod/belts/arrays, nanotube, nanodisks, nanoboxes, nanocylinders, nanospheres, nanococoons and nanospindles, among others, in one embodiment of the invention, the hollow nanostructures of the invention are symmetrical, in that they comprise at least one axis of symmetry; in other embodiments, the hollow nanostructures may be asymmetrical.

Figure 1A:
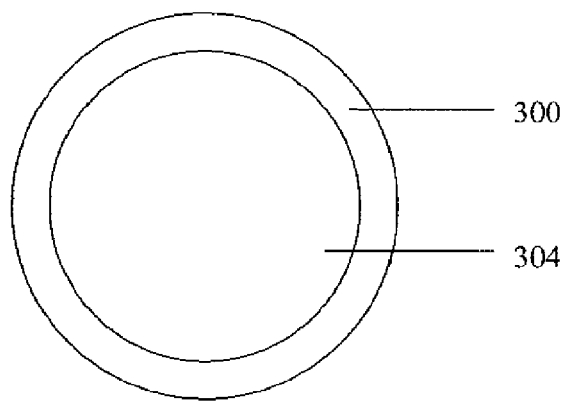
FIGS. 1A, B, and C depicts a cross-sectional schematic diagram of nanostructures comprising various shell-like structures enclosing a hollow internal void.
Figure 1B:
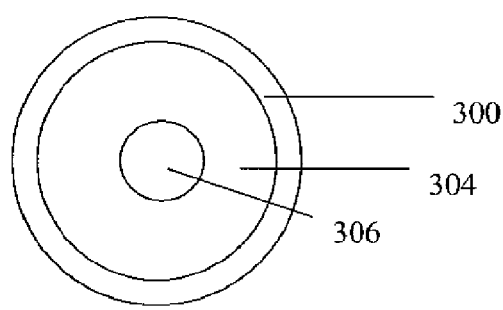
Figure 1C:
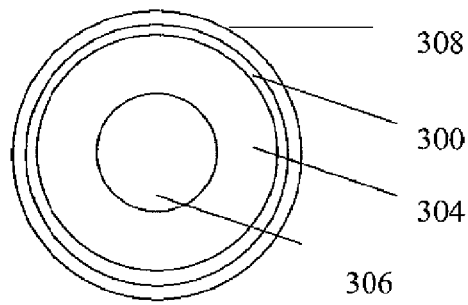

As depicted in FIGS. 1A, B, and C by way of example of a hollow nanosphere, the nanostructures of the invention comprise shell-like structures enclosing a hollow internal void. These nanostructures include, but are not limited to:

(i) a nanostructure comprising a single nanostructured shell 300 enclosing a hollow internal void 304 (FIG. 1A);

(ii) a nanostructure comprising a single nanostructured shell 300 enclosing a hollow internal void 304, in which is contained a solid or nanostructured inner core 306 (FIG. 1B);

(iii) a multiple-shelled nanostructure comprising a single nanostructured shell 300 and at least one additional concentric nanostructured shell 308 enclosing a hollow internal void 304, which optionally comprises a solid or nanostructured inner core 306 (FIG. 1C). As defined herein, the term "concentric" is not limited to circular shells, or shells that share a common center, but is meant to define shells that are "one inside the other."

In the embodiment in which the nanostructure comprises multiple nanostructured shells, the shells may be in direct contact with each other at one or more points on their respective surfaces, in foil contact at all points on their respective adjacent surfaces, or may be separated by an intervening void. The intervening void may he completely hollow or may comprise an additional material. As stated above, the basic cross-sectional elements of the nanostructures as depicted are applicable to varying cross-sectional shapes, forms, and sizes.

Typically, the average cross-sectional distance of the nanostructure, depending on its shape and morphology, may vary between about 50.0 nm to about 1,000.0 nm, more particularly between about 100.0 nm and about 700.00 nm, and still more particularly between about 200.0 nm and about 500.0 nm. The average thickness of the nanostructured shells may vary from about 10.0 nm and 50.0 nm, more particularly between about 15.0 nm and 40.0 nm, and still more particularly between about 20.0 nm and about 30.0 nm. In those embodiments of the nanostructures comprising an inner core, the core typically comprises an average diameter of between about 50.0 nm and 500.0 nm, more particularly between about 200.0 nm and about 400.0 nm, and still more particularly between about 75.0 nm and about 125.0 nm.

In one embodiment, the nanostructures of the invention may comprise a single pore or a plurality of pores within one or more of the nanostructured shells. Unless stated herein, the pores may be present in any nanostructured shell anywhere on said shell. As discussed herein, the term pore may be construed as a hole of any shape or size across the entire thickness of a nanostructured shell. For those nanostructures comprising multiple nanostructured shells, the pores may be present in only one nanostructured shell, all nanostructured shells, or a subset of the nanostructured shells. In one embodiment of the invention, the pores are present in only the outermost shell. In another embodiment, the pores are present in every shell. In another embodiment, a pore in one nanostructured shell may be contiguous with a pore in an adjacent nanostructured shell. In yet another embodiment, a pore across each nanostructured shell is contiguous with a pore in the adjacent concentric shell such that the contiguous pores create an opening from the exterior of the nanostructure to the internal void.

In keeping with IUPAC notation (J. Rouquerol et al., *Pure & Appl. Chem*, 66 (1994) 1739-1758), pores in the nanostructured shells may be microporous pores with pore dimensions less than about 2.0 nm., macroporous with pore dimensions typically greater than about 50.0 nm, or mesoporous with pore dimensions between 2.0 and 50.0 nm. Typically, the pores in the nanostructured shells diameters between about 1.0 nm and about 10.0 nm, more particularly between about 3.0 nm and about 5.0 nm. In one embodiment, a single-shelled nanostructure may comprise a single macropore of sufficient diameter such that the resulting nanostructure resembles a cup or a bowl, in another embodiment, the presence of contiguous macropores in a multi-shelled nanostructure may result in a similar cup or bowl-like nanostructure. In yet another embodiment of the invention, the pores are formed by treating the nanostructure with a pore-forming material (porogen) followed by heating between 100 and 1,000° C. C. V. Nguyen et al., *Chem. Mater.* 11, 3080 (1999); C. Nguyen et al., *Macromolecules* 33, 4281 (2000). Heat may be applied at high temperatures in an autoclave. Alternately, the porogen-treated nanostructure may be dried at low temperatures (<0° C.) in a lyophilizer, The nanostructured shells of the invention are poly crystalline, typically comprising a plurality of tin oxide primary metal oxide "crystallites," which may vary in size. The average size of these primary crystallites is between about 1.0 nm and about 50.0 nm, more particularly between about 10.0 nm and about 20.0 nm.

Figure 2A:
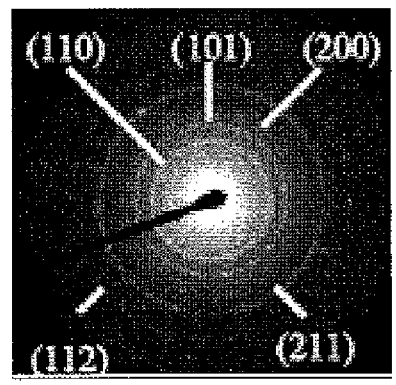
FIG. 2A depicts the ring-like selected area electron diffraction pattern ("SAED") pattern shown by the $SnO_2$ in the nanostructured shell.
Figure 2B:
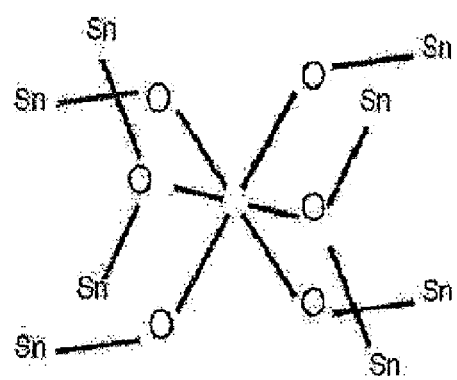
FIG. 2B depicts the rutile tetragonal structure of $SnO_2$.

X-ray diffraction patterns ("XRD") conducted on a nanostructure comprising $SnO_2$ nanostructured shells confirm the polycrystalline nature of the nanostructured shells. The XRD patterns determined can he assigned to tetragonal rutile $SnO_2$ (cassiterite, JCPDS card No. 41-1445, space group: $P4_2/mnm$, $\alpha_o=4.738$ A, $c_o=3.187$ A) as is to he expected for polycrystalline $SnO_2$. The SAED pattern shown in FIG. 2A indicates that the nanostructures are polycrystalline and the diffraction rings from inside to outside can be indexed to (110), (101), (200), (211) and (112) planes of rutile $SnO_2$, respectively. The diffraction rings come from different crystal, planes, with each crystal plane in a primary crystal generating a point in the SAED pattern. The rutile tetragonal structure of $SnO_2$ typically looks like the structure depicted in. FIG. 2B, where the Sn atom is octahedrally surrounded by oxygen atoms, which, in turn, are surrounded by planar triangles of Sn atoms.

Figure 2C:
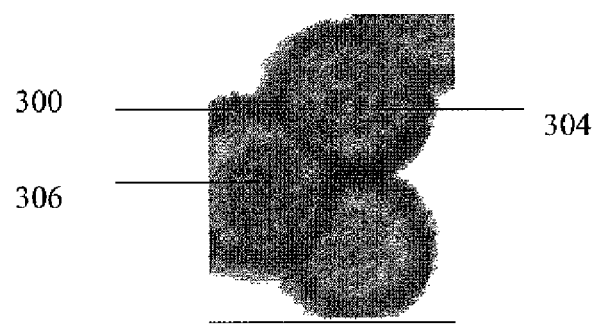
FIG. 2C is a magnified energy filtered Transmission electron microscope ("TEM") image of a $SnO_2$ nanosphere.

The cross-structural morphology of the metal oxide nanostructures of the invention are further illustrated by a low magnification transmission electron microscopy ("TEM") image as shown in FIG. 2C. The $SnO_2$ nanospheres clearly depict the nanostructured outer shell 300, the inner space 304 and an internal core 306. The dark contrast inside each shell as shown, in FIG. 2C reveals that the inner space is in fact filled with a solid core. Such nanostructures can be prepared using a template-free as well as the template-based methods taught by the invention and discussed herein.

As stated, herein, controlled synthesis of the foregoing nanostructures may be carried out by a simple "one-pot" template-free manner or by using templates and employing a shell-by-shell deposition of the metal oxide. The one-pot template-free method based on a novel and unusual "inside-out Ostwald ripening mechanism" comprises the steps of combining metal oxide precursor with a solvent to create a mixture, optionally adding one or more yield-enhancing additives (fore example, urea-based additives) to this mixture, and heating this mixture for a predetermined reaction times. These steps may be followed by cooling, centrifugation and washing with deionized water. This one-pot, template-free method taught by the invention is highly advantageous over existing methods in that it involves fewer steps than existing methods suitable for high-yield mass production of monodisperse, structurally sound metal oxide nanospheres. By way of example of the production of $SnO_2$ nanospheres using a potassium stannate precursor, this template-free method has been shown to give high yield mass production of $SnO_2$ hollow nanospheres as measured by the % of Sn units in the stannate precursor converted to $SnO_2$ crystallites in the end-product, and at nearly 100% morphological yield (i.e., the percentage of nanospheres displaying the same size, shape and cross-sectional characteristics).

Preferably, the precursor salt of the metal oxide is an alkali metal precursor salt more preferably the alkali metal precursor salt is a sodium or a potassium salt, most preferably the potassium salt. Thus, when the desired metal oxide nanostructure is a $SnO_2$ nanostructure, the metal precursor salts may be sodium stannate or potassium stannate. The mixed solvent typically comprises a polar solvent in water, preferably a highly polar solvent with some degree of hydrophobic/surfactant character, more preferably, any $C_2$ to $C_{10}$ alcohol which may be employed as a single component or in mixture with other additives. Typically, the yield-enhancing additives used in the method comprise urea compounds (such as urea and thiourea), —$NH_2$ compounds (including, but not limited to ammonia, ethylenediamine, surfactants amines, diamines, ammonia, and hydrazine), or surfactants, both ionic and non-ionic (for example, cetyltriniethylammortium bromide ("CTAB"), Tween-based compounds, dodecyl sulfates, etc.). Preferably, yield-enhancing additives are urea-based catalytic additives such as urea and thiourea. Additional yield-enhancing additives, including ammonia, ethylenediamine and surfactants such as cetyltriniethylammortium bromide ("CTAB") may be used during synthesis. In addition, ammonia may be used as a pH modifier. Ethylenediamine and the CTAB surfactant may be used to effect the shape and size of the end product. Typically, the mixture of the metal-oxide precursor in the mixed solvent and the yield enhancing additives is heated to a temperature of between 140 and 200° C., preferably between 3 and 24 hours.

By way of example, describing the formation of a hollow $SnO_2$ nanosphere by heating a mixture of potassium stannate in a mixed ethanol/water solvent in the presence of urea, the mechanism for the template-free formation of hollow nanostructures may be described. During the first stage of reaction, solid nanospheres are formed by hydrolysis of the stannate. With prolonged hydrothermal treatment, these solid nanospheres are transformed by the "inside-out Ostwald ripening" or "core evacuation" of the formed solid nanosphere in which the metal oxide crystals inside the solid nanosphere are forced out of the solid nanosphere to create an internal void. Ostwald ripening, first described by Wilhelm Ostwald in 1896, is a well-known particle (crystal) growth mechanism, in which the growth of large particles occurs at the expense of small ones while trying to minimize the surface energy (because of the smaller surface to volume ratio in large particles), in the case of the nanostructures of the invention, inside-out Ostwald ripening is understood to be the process by which the metal oxide crystals in the interior of the nanostructures dissolve preferentially because of the crystallization of the metal oxides on the surface of the forming nanostructures, even as the more amorphous material within the interior of the nanostructure amorphous tend to dissolve. L, Archer, X. W. Lou, *Adv. Mater.* 2006 18, 2325-2329; H. G. Yang, H. C. Zeng, *J. Phys. Chem. B* 2004, 108,3492; J. Li H. C. Zeng, *Angew. Chem.* 2005, 117, 4416.

This inside-out ripening process may initiate at regions either just below the external surface of the solid nanosphere, or around the nanostructure center, depending on the reaction conditions. Core evacuation by either mechanism yields, respectively, hollow nanostructures or hollow nanostructures in which the internal void comprises a solid core. Since the solid nanospheres typically formed first are not typically single-crystalline but comprise many tin oxide primary crystallites, the tin oxide particles in the inner region are packed more loosely than those in the outer layer resulting in larger surface energies which can lead to the tendency to dissolve. Moreover, as the hollowing process is typically accompanied by crystallization of the particles, the primary particles in the outer surfaces are relatively easy to crystallize facilitated by surrounding solvent, and therefore less crystalline particles in the inner region are easy to dissolve.

Figure 3:
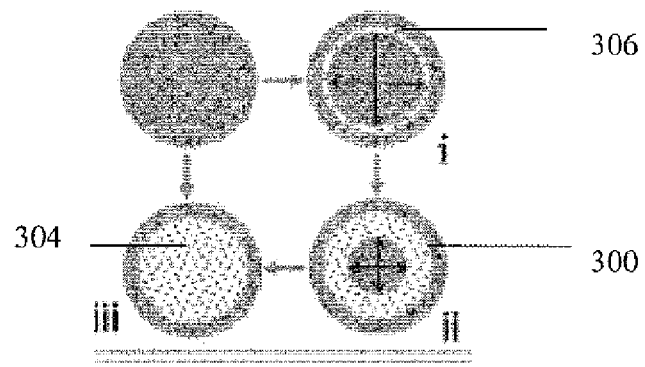
FIG. 3 illustrates cross-sectional diagrams of the inside-out ripening mechanism that forms the basis of the one-pot template-free synthesis of a metal oxide hollow nanostructure.

FIG. 3A illustrates cross-sectional diagrams of the proposed inside-out ripening mechanism: inside-out evacuation can initiate from just below surface of the shell 300 to form nanostructure (i) in which the hollow inner void 304 is beginning to be formed; then evolve to form a nanostructure (ii) with a well-defined inner void 304 further comprising an inner core 306; and further to hollow nanostructure (iii). Alternately, inside-out ripening mechanism may start around the central region of the solid sphere and evolve to particle (iii) directly.

By carefully controlling certain key reaction parameter in the template-free method of the invention the shape, size, morphology, and yield of the resulting metal oxide nanostructure may be determined. These parameters include, but are not limited to, the type and concentration of the metal-oxide precursor, the properties of the polar solvent and the polarity of the resultant polar solvent/water mixture, the type and amount of yield-enhancing additives used, the temperature at which the mixing reaction is conducted, and the length of time for which this reaction is performed.

In one embodiment of the invention, changes in precursor concentration affect both the morphology and size of the end-product. By way of example of the production of $SnO_2$ nanospheres, it was determined that when the precursor concentration of potassium stannate was reduced from 8.4 mM to 4.7 mM. the product comprised discrete hollow nanospheres with diameters in the range of 50.0 nm to 200.0 nm and a shell thickness of 10.0 nm. In comparison, keeping all other reaction parameters the same, a higher precursor concentration (e.g. 22 mM) produced nanospheres comprising a core spaced apart from and surrounded by a shell at approximately the same thickness (10.0 nm), but with larger diameters, for example, between about 300.0 and about 400.0 nm as well as a highly defined inner core within the internal void.

Apart from precursor concentration, solvent characteristics arc also relevant in affecting control of the end product. As stated previously, the solvent is preferably a highly polar solvent with some degree of hydrophobic/surfactant character, more preferably, any $C_2$ to $C_{10}$ alcohol which may be employed as a single component or in mixture with other additives. Typically, the polar solvents are dissolved in water to create a mixed solvent. Typically, the ratio of $C_2$ to $C_{10}$ alcohol to water used is 1:1, but ratios may range from 5:1 to 1:4 to produce similar results. By way of example of the hydrothermal template-free production of $SnO_2$ nanospheres in a mixed ethanol ("EtOH")/water solvent, it was shown that the r value (EtOH v/v% in the solvent of $EtOH/H_2O$) or polarity of the mixed solvent is a parameter which has an effect on the resultant metal oxide nanostructures. Typically, the preferred r values are in the range of 30-50%. In general, well-defined hollow nanospheres are difficult to produce when r is lower than 30%. In order to synthesize. well-defined, mono-dispersed, hollow $SnO_2$ nanospheres at r values <30%, the precursor concentrations must he increased than what are required for higher r values. If the r value remains fixed at less than 30%, and often even at less than 40%, aggregated clumps of small $SnO_2$ crystallites form, instead well-defined $SnO_2$ microspheres. For example, while keeping the r value fixed at 37.5% while changing the precursor potassium stannate concentrations, the products comprise mixtures of single hollow nanospheres (100-250 nm) and aggregated nanospheres at a precursor concentration of 13.5 mM, well-defined hollow nanospheres (300-550 nm) at a precursor concentration of 16.5 mM, and bowl-like large hollow spheres (450-750 nm) at a precursor concentration 19.5 mM, respectively.

In another embodiment, the effect of urea-based catalytic additives such as urea and thiourea was found to increase both the product yield (measured by the % of Sn units in the stannate precursor converted to $SnO_2$ crystallites in the end-product) and morphological yield to nearly 100%. As an example, hollow $SnO_2$ nanospheres produced in the presence of urea, keeping all other reaction parameters the same are well dispersed with good monodispersity (usually 80-200 nm in diameter and an average shell thickness of about 20 nm).

In another embodiment of the invention, temperature of the reaction can be varied to affect changes in shape, size and morphology. By way of example, in the case of hollow $SnO_2$ nanospheres, it was shown that product synthesized at 150° C. comprises monodispersed hollow nanospheres with sizes in the range of 350-460 nm, while those prepared at 180° C. assume a bowl-like shape at a similar size. In another embodiment of the invention by way of example of hollow $SnO_2$ nanospheres, the hydro thermal reaction period was shown to affect the final product. While the size of the $SnO_2$ nanospheres obtained in the presence of thiourea at different hydrothermal reaction times do not typically increase with longer reaction times, their shell thicknesses may decrease from ~50 nm to ~20 nm, illustrating the continuing evacuation of $SnO_2$ nanospheres thus increasing the size of the inner void, while at the same rime decreasing the thickness of the nanostructured shell. Other time-dependent experiments in which all other synthesis conditions except reaction times were kept identical, the size distribution of the nanospheres appeared largely unaltered, while the morphology changed. Specifically, the product comprised solid nanospheres after a reaction time of 6 hours, and hollow nanospheres when allowed to react for 24 hours.

The present invention also teaches a novel template based shell-by-shell nanostructure synthesis. Unlike existing methods of preparing nanostructures, the shell by shell synthesis taught by the invention creates nearly mono-disperse, narrow-size distribution, hollow nanostructures.

Unlike existing methods taught in the prior art where the templates are pre-treated, fee method as taught by the invention requires no prior surface modification of the template resulting in both time and cost-savings over existing methods for producing nanostructures. In particular, the advantages of this method allow this method to be used in large-scale and industrial scale applications. The deposition protocol involves direct treatment of the template with the metal oxide precursor in the presence of a mixed solvent and a catalyst which creates a poly crystalline nanostructured metal oxide shell over the template. In one embodiment of the invention, the method may be used to create a single nanostructured shell, while in other embodiments, the deposition protocol is successively repeated to create two or more polycrystalline nanostructured shells such that each newly created shell surrounds the prior formed shell. The shell-by-shell deposition protocol as taught by the invention may be used on any suitable template including, but not restricted to, templates made of silica, latex, carbon, gels, micelles, or combinations thereof. The shell-by-shell deposition protocol may also be used on templates of any shape, including, but not restricted to, spherical, polyhedral, cylindrical templates as well as any other symmetrical or asymmetrical templates. It has also been shown that the shell-by-shell synthesis as taught by the invention can work on template sizes in which the size of the template as measured by its longest cross-sectional distance is between 50.0 to 1,000.0 nm. preferably between 150.0 to 500.0 nm, and more preferably between 200.0 to 300.0 nm.

Figure 4:
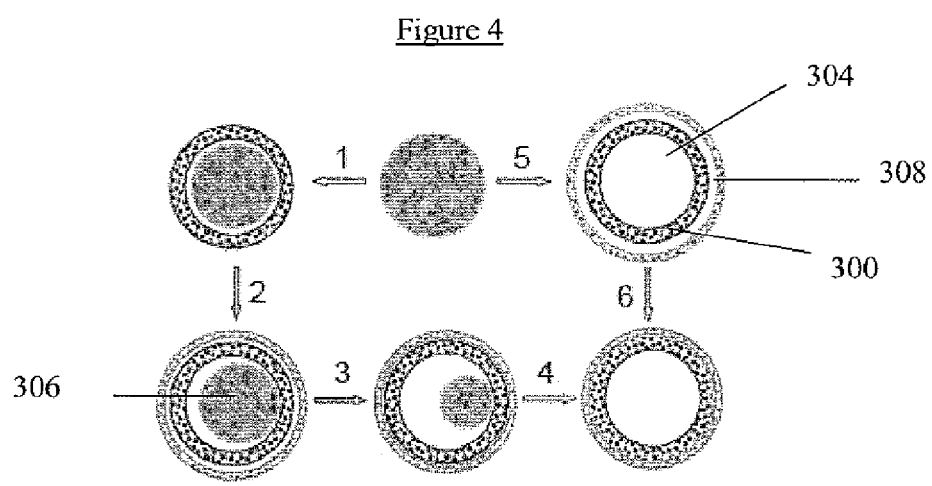
FIG. 4 illustrates the shell-by-shell template-based method of preparing a $SnO_2$ nanosphere.

By way of example only, the shell-by-shell synthesis of the invention may be illustrated by the formation of polycrystalline $SnO_2$ nanospheres as depicted in FIG. 4. The $SnO_2$ precursor is first hydrothermally deposited on silica nanospheres to form a single nanostructured shell 300 as shown in Step 1. This single nanostructured shell then serves as an interim nanotemplate for further deposition. This deposition step may be repeated to form double shells 308 as shown in Step 2. As formed, the double-shelled nanostructures still contain partially dissolved silica cores 306, the sizes of which may be controlled by "etching" (or dissolution) with dilute HF (typically about 1-2% wt %) to form either a hollow inner void 304 with an internal core 306 comprising the unetched template material (Step 3), or proceed to form a completely hollow inner void 306 (Step 4). Double-shelled hollow nanostructures can also be formed in a single step by increasing die relative amount of silica template (Step 5). By increasing the extent of HP etching, the double-shelled hollow nanostructures can be transformed into a single shell hollow nanostructure (Step 6). Typically, the hydrothermal deposition of $SnO_2$ is carried out under basic conditions at a pH between 9 and 12, more preferably between 10 and 11.

As with the one-pot template-free method described herein, preferably, the precursor salt of the metal oxide is an alkali metal precursor salt, more preferably the alkali metal precursor salt is a sodium or a potassium salt, most preferably the alkali metal precursor salt is a potassium salt. Thus, when the desired metal oxide nanostructure is a $SnO_2$ nanostructure, the metal precursor salts may be sodium stannate or potassium stannate. The mixed solvent typically comprises a polar solvent in water, preferably a highly polar solvent with some degree of hydrophobic/surfactant character, more preferably, any $C_2$ to $C_{10}$ alcohol which may be employed as a single component or in mixture with other additives. Typically, the yield-enhancing additives used in the method comprise urea compounds (such as urea and thiourea), —$NH_2$ compounds (including, but not limited to ammonia, ethylenediamine, surfactants amines, diamines, ammonia, and hydrazine), or surfactants, both ionic and non-ionic (for example, cetyltriniethylammortium bromide ("CTAB"), Tween-based compounds, dodeeyl sulfates, etc.) Preferably, yield-enhancing additives are urea-based additives such as area and thiourea. In addition, ammonia may also be used as a pH modifier. Ethylenediamine and the CTAB surfactant may be used to effect the shape and size of the end product. Typically, the mixture of the metal-oxide precursor and the template in the mixed solvent (and optionally the yield enhancing additive)s is heated in m autoclave to a temperature of between 100 and 1000° C., preferably between 120 and 200° C., most preferably between 140 and 180° C.

Various parameters are known to affect the shell-by-shell synthesis of the metal oxide nanostructures. For instance, depending on the kind of metal oxide nanostructure desired, the synthesis was found to have an optimal precursor concentration. By way of example, using the production of $SnO_2$ nanospheres, and keeping the precursor concentration at a concentration of 16 mM, it was determined that using silica template amounts of 100 to 160 mg, more preferably 120 to 140 mg result in single-shelled nanostructures. When the amount of silica template is reduced from 120 mg to 80 mg, some double-shelled nanostructural formation is observed, but only in the form of irregular $SnO_2$ crystallites. Only when the amount of silica template is further reduced to between 30 and 50 mg, more preferably 40 to 45 mg, are well-formed double-shelled hollow nanostructures observed.

The size of the inner cavity may be controlled by the extent of HF etching. For instance, for those double-shelled nanostructures bearing an internal silica core, continuous HP etching leads to the greater dissolution of the inner silica core and the simultaneous enlargening of the inner cavity, while also causing the dissolution of the nanostructured double-shell into a single shell, L, Archer, X. W, Lou, *Small* 2006 0000, 00, No. 01-5 (Manuscript available at www.small-journal.com).

For those nanostructures with only one shell, the structural integrity of a single-shelled nanostructure may be enhanced either by the creation of one or more additional shells or by a post-synthesis annealing process carried out at temperatures between 400 to 600° C., more preferably between 500 and 550° C. Alternately, structural integrity may also be enhanced by increasing the deposition temperature from a range of about 140 to 160° C. to between 180 to 200° C.

The present invention allows for the exploitation of the single or multi-shelled hollow nanostructures by functionalizing the inner cavity with potentially useful nanoparticles. In one embodiment of the invention, the inner cavities may be functionalized with magnetic nanoparticles by first coating the nanoparticle with the template material. Magnetic nanoparticles include, but are not limited to, nanoparticles comprising ferric oxides including, but not limited to, $Fe_2O_3$, $Fe_3O_4$, $CoFe_2O_4$, as well as other metal oxides like $Co_3O_4$, ZnO, CuO, $Cu_2O$, or even metal sulfide semiconductors like CdS, ZnS, etc. Materials with other functional properties, including noble metals, like Au, Ag, Pt, Pd. etc., may also be enclosed within the inner space of the nanostructures of the invention. The template material may include any suitable material that may be coated onto said magnetic nanoparticle. Template materials include, but are not limited to, latex, silica, gels, carbon, or combinations thereof. Such functionalized nanostructures with magnetized functionalities may be used in applications such as targeted drug delivery, separation methods, biomedical imaging, and use in photovoltaic cells among others. In one preferred embodiment of the invention, $SnO_2$ is deposited on an $\alpha$-$Fe_2O_3$ nanosphere, nanococoon, or nanospindle by the shell-by-shell synthesis taught by the invention to form the corresponding uniform multi-shelled $SnO_2$ nanostructure.

Figure 5:
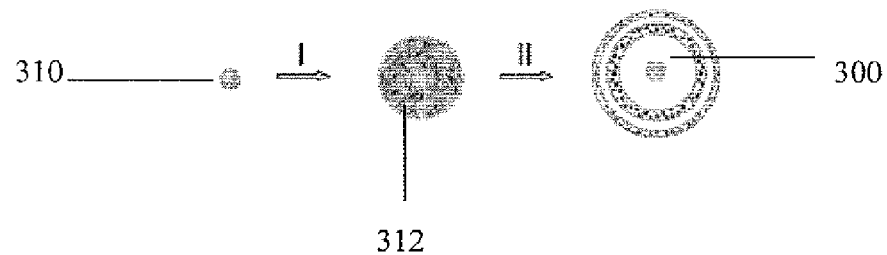
FIG. 5 depicts cavity functionalization of a nanosphere with an Au nanoparticle.
Figures 6A, 6B, 6C, 6D:
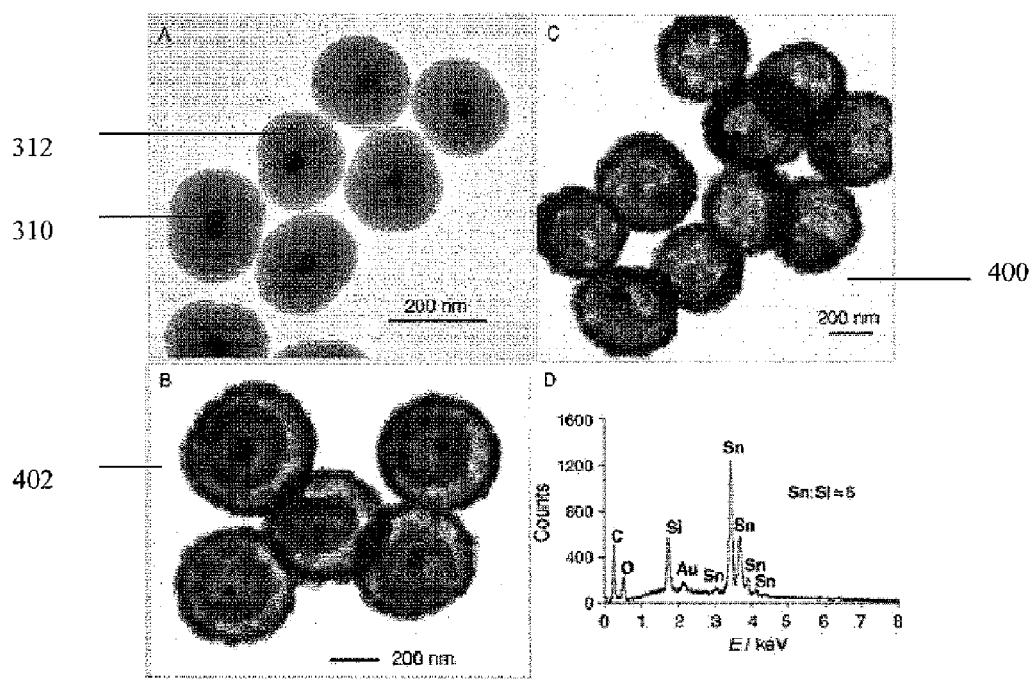
FIGS. 6A and 6B depict TEM images of Au/silica core/shell particles and double-shelled Au/$SnO_2$ hollow colloids prepared via steps I and II of FIG. 5, respectively.
FIG. 6C shows Au/$SnO_2$ hollow colloids obtained by HF etching the colloids shown in FIG. 5B.
FIG. 6D depicts the EDX spectrum of the particles shown in FIG. 5.

In yet another embodiment of the invention, noble metals including, but not limited to Au, Ag, Pt, Pd, etc. are treated with a template material and then subjected to a metal oxide shell-by-shell nanaostructure synthesis as taught by the invention to create a mixed metal/metal oxide nanostructure functionalized to serve a particular end use. In one preferred embodiment of the invention, the functional metal is gold, while the metal oxide is SnO2. Using the shell-by-shell synthesis of the invention, a mixed Au—SnO2 metal-semiconductor composite nanostructure is created that is suitable for use in applications such as sensors, catalysts, controlled release drug delivery systems and bioseparations. The process by which an Au nanoparticle is functionalized within a hollow $SnO_2$ nanostructure is shown in FIG. 5. Step I involves the conformal coating of Au nanoparticles 310 with uniform shells of silica 312. The as-obtained An/silica nanoparticle are then used as the template for subsequent $SnO_2$ deposition to form a $SnO_2$ shell 300 in Step II. FIGS. 6A and 6B depict TEM images of Au/silica core/shell particles 400 and double-shelled Au/$SnO_2$ hollow colloids 402 prepared via steps I and II of FIG. 5, respectively; FIG. 6C shows Au/$SnO_2$ hollow colloids obtained by HF etching colloids shown in FIG. 5B; FIG. 6D depicts the energy dispersive X-ray ("BOX") spectrum of the particles shown in FIG. 5B.

The polycrystalline metal oxide nanostructures of the invention generated by the methods taught herein, may also be coated with additional industrially useful materials, in one embodiment, the metal oxide nanostructures of the invention may serve as templates to be coated with materials bearing electrical conductivity properties, where optionally the metal oxide nanostructures bear electrical conductivity properties as well. In a preferred embodiment, the metal oxide nanostructures are $SnO_2$ nanostructures that are coated with semiconductors including, but not limited to, propylenevinylidenefluoride ("PVDF"), hexafluoropropylenevinylidenefluoride semiconductor ("PVDF-HFP"), and carbon-black filled PVDF or PVDF-HFP. For those nanostructures used as semiconductors in new generation lithium batteries, the added presence of such conductors on the metal oxide nanostructures enhances cyclabiltty by improving the contact between the nanostructure and the battery. L. Archer, X. W. Lou, *Adv. Mater.* 2006 18, 2325-2329; Xinlu Li, Feiyu Kang, and Wanti Shen, *Electrochem. Solid-State Lett.*, 2006, 9, A126-A129.

The metal oxide nanostructured materials of the present invention maybe used in a variety of applications. For example, the materials may be utilized as nanoscale chemical reactors, catalysis and photocatalysts, photovoltaic devices and as the anode in lithium storage batteries.

When used as anode materials in lithium ion batteries, nanostructured $SnO_2$ made in accordance with the present invention exhibits enhanced electrochemical properties. One hindrance against use of Sn-based anode materials in lithium ion batteries is the large volume change exhibited by Sn-based particles, owing to particle shattering and agglomeration during charging/discharging processes which leads to poor cyclability. The hollow nanostructures of the invention mitigate this problem. $SnO_2$ nanostructures of the present invention exhibit initial discharge capacities between about 1000.0 mAh/g and 1,300 m Ah/g and more particularly between about and about 1,100 and 1,200 mAh/g and still more particularly greater than 1,100 mAh/'g. Additionally, the nanostructures may undergo between about 25 and 45 cycles and more particularly between about 30 and 40 cycles while still functioning effectively at a discharge capacity of at least 300 mAh/g. It is believed that the superior lithium storage capacity is associated with the unique structure of hollow nanospheres with porous shells formed during the inside-out evacuation process.

EXAMPLES

The present invention is illustrated, but in no way limited by the following examples.

Example 1

Hollow SnO nanoparticles were prepared by a hydrothermal method in an ethanol/$H_2O$ mixed solvent. Potassium stannate trihydrate ($K_2SnO_3$; $3H_2O$, Aldrich, 99.9%) was added to 30 ml of elhanol/$H_2O$ mixture with an r value of 25-50%, to achieve potassium stannate concentrations of 4.7mM-40 mM, After gentle shaking by hand for about 5 minutes, a slightly white translucent or clear solution (depending on values of r and e) was obtained, which was then transferred to a 40 mL Teflon-lined stainless steel autoclave. In certain experiments, urea, thiourea or ethyldiamine were also used as additives, typically with overall concentrations of about 0.1 mM. After heating in an electric oven at 150° C. for a period of 3-48 hours, the autoclave was gradually cooled down in air, or rapidly using tap water. The white product was harvested by centrifugatian and washed with deionized water and ethanol before drying at 50° C. overnight.

The electrochemical properties of the hollow $SnO_2$ nanospheres were characterized at room temperature. For these measurements $SnO_2$ nanospheres were used to form the negative electrode in rechargeable lithium-ion batteries. The working electrode comprised 80 wt % of the active material (hollow $SnO_2$), 10 wt % of conductivity agent (carbon black, Super-P), and 10 wt % of binder (polyvinylidene difluoride, PYDF, Aldrich). lithium foil was used as the counter and reference electrodes. The electrolyte was 1 M Li $PF_6$, in a 50:50 w/w mixture of ethylene carbonate and diethyl carbonate. Cell assembly was carried out in a glove box with the concentrations of moisture and oxygen below 1 ppm. The room-temperature electrode activities were measured using a Maccor-Series-2000 battery tester (Maccor, Inc. Tulsa, Ok.). The cells were charged and discharged at a constant current of ~0.2 C and the fixed voltage limits were between 2 V and 5 mV. Cyclic vollammetry was performed on an EG&G model 273 potentiostat/galvanoslat (Princeton Applied Research, Oakridge, Tenn.) using the active anode as the working electrode and lithium as both the counter and reference electrodes. FIG. 7A shows the first cycle charge-discharge curve of $SnO_2$ hollow nanospheres 500. It is apparent from FIG. 7A that the $SnO_2$ hollow nanospheres display a very large initial discharge capacity of about 1140 mAh/g. This value is more than 75% greater than that of pristine $SnO_2$ nanoparticles which display an initial discharge capacity of about 645 mAh/g and also higher than, any other previously reported SnO based hollow structures. FIG. 7B compares the cycling performance of as-prepared $SnO_2$ hollow nanospheres of the invention (curve a) 502 with pristine SnO hollow nanospheres synthesized in accordance with the methods outlined in *J. Power Sources* 2005, 144, 220 by Wang and Lee (curve c) 506 and previous $SnO_2$ hollow nanospheres synthesized in accordance with the methods outlined in Y. Wang et al, *Chem. Mater,* 2006, 18, 1347 (curve b) 504, which were all tested under similar conditions. It is apparent from this figure that the cycling performance of the $SnO_2$ hollow nanospheres of the present invention is superior.

Specifically, while all materials show some fall-off in performance over time, the capacity of the $SnO_2$ hollow nanospheres of the invention is still comparable to the theoretical capacity of $SnO_2$ after more than 30 cycles; and much higher than the theoretical capacity of graphite after more than 40 cycles.

Figure 8:
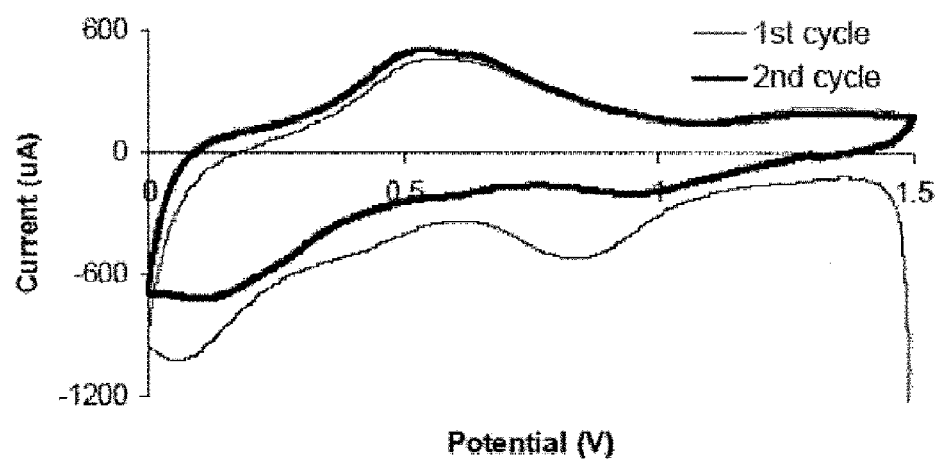
FIG. 8 illustrates cyclic voltammograms of hollow $SnO_2$ nanospheres (first and second cycle). The scan range of 0-1.5 V (vs. lithium) was swept at the rate of 0.1 mV/s).

Cyclic voltammograms, shown at FIG. 8, are consistent with previously reported $SnO_2$ anode materials, indicating the same mechanism for lithium storage, nanopores in the shells and the interior microcavities of hollow nanospheres should allow or at least facilitate storage of the extra amount of lithium. Specifically, FIG. 8 illustrates cyclic voltammograms of hollow $SnO_2$ nanospheres (first and second cycle). The scan range of 0-1.5 V (vs. Lithium) was swept at the rate of 0.1 mV/s).

Example 2

Monodisperse silica nanospheres with different sizes were prepared from the welt known Stobers method. W. Stober, A. Fink, B. Bohn, *J. Colloid Interface Set* 1968, 26, 62-69. Polycrystalline $SnO_2$ shells were facilely deposited on silica templates without any prior surface modification by a hydrothermal method. Depending on the amount of nanostructures desired, 40-120 mg silica nanospheres were first dispersed by ultrasonication in 30 ml of ethanol/water (37.5 vol % ethanol) mixed solvent. To this white suspension, urea (0.9 g or 0.5 M) and potassium stannate trihydrate (~144 mg or 16 mM; $K_2SnO_3 \cdot 3H_2O$, Aldrich, 99.9%) were, added. After shaking by hand for about 5 minutes until the salt dissolved, the suspension was transferred to a 40 ml Teflon-lined stainless-steel autoclave, which was then heated in an airflow electric oven at 150-190° C. for 36 hours. After the autoclave cooled down naturally, the white product was harvested by centrifugation and washed with deionized water. This hydrothermal $SnO_2$ deposition can be repeated to form double and even triple shells. The silica core was etched In a dilute ethanol/water solution of HF (~2%).

Example 3

The Au/silica core/shell particles were prepared as described in detail by Liu et ah S. H. Liu, M. Y. Han, *Adv. Funct. Matter.* 2005, 15, 961-967, After extensive washing with water, the as-obtained Au/silica core/shell particles (~50 mg) were directly used without drying as the template for the same $SnO_2$ deposition.

Example 4

α-$Fe_2O_3$ spindles were prepared by aging a solution of 0.02 M $FeCl_3$ and 0.45 mM $NaH_2PO_4$ at 105° C. for 48 hours as described by Ozaki et at M. Ozaki, S. Kratohvili, E. Matijevic, *J. Colloid Interface Set.,* 1984, 102, 146-151. For $SiO_2$ coating, 63 mg α-$Fe_2O_3$ spindles were first dispersed by ultrasonication in a mixture consisting 650 ml of 2-propanol and 65 ml of deionized water, followed by 60 mL of ammonia (29.6%). Under magnetic stirring, 4 mL of tetraethylorthosilicate ("TEOS") in 2-propanol (10% v/v) was added, followed by another 3.5 mL of TEOS after 2 hours. The reaction was then continued for 18 hours. The α-$Fe_2O_3$/$SiO_2$ particles were harvested by centrifugation, and washed with ethanol and water several times before being vacuum-dried at room temperature. For hydrothermal SaCh deposition, 118 mg α-$Fe_2O_3$/$SiO_2$ particles were dispersed in 25 mL of ethanol/water (37.5 vol % ethanol) mixed solvent. To this suspension, urea (0.75 g) and potassium, stannate trihydrate (113 mg; $K_2SnO_3 \cdot 3H_2O$, Aldrich (St. Louis, Mo.), 99.9%) were added. After shaking by hand for about 5 minutes until the salts dissolved, the suspension was transferred to a 40 mL Teflon-lined stainless-steel autoclave, which was then heated in an air flow electric oven at 170° C. for 36 hours. After the autoclave was allowed to cool down naturally, the particles were washed with ethanol/water once before the same hydrothermal deposition was repeated. For synthesis of porous double-shelled nanococoons, about 34 mg α-$Fe_2O_3$/$SiO_2$ particles were used. After annealing the particles at 550-600° C. for 8 hours, the silica was dissolved in 1 M NaOH solution at 50° C. for about 2 days (alternately, the silica is dissolved by etching in a very diluted HF solution as $SnO_2$ tends to partially dissolve in NaOH solution when exposed to NaOH for extended periods of time).

The nanococoons were characterized with X-ray powder diffraction ("XRD") using a Scintag PAD X-ray Powder Diffractometer (Scintag PAD X, Cu K α, λ=1.5406 Å) (Scintag, Inc, Cupertino, Calif.), transmission electron microscopy (TBM/SAED) using a JEOL-1200EX transmission electron microscope (120 kV) (JEOL, Tokyo, Japan), ultra-high vacuum scanning transmission electron microscopy (UHV-STEM, 100 kV) (Fisons Instruments, Inc. San Carlos, Calif.) equipped with energy dispersive X-ray analysis (EDX), and field emission scanning electron microscopy (FE-SEM; LEO 1550) (Carl Zeiss, Oberkoehen, Germany). Nitrogen adsorption and desorption isotherms were measured using the Micromeritics ASAP 2020 Accelerated Surface Area and Porosimetry analyzer (Micromeritics, Inc., Norcross, Ga.).

Numerous references, including patents and various publications, are cited and discussed in the description of this invention. The citation and discussion of such references is provided merely to clarify the description of the present invention and is not an admission that any reference is prior art to the invention described herein. All references cited and discussed in this specification are incorporated herein by reference in their entirety.

Variations, modifications and other implementations of what is described herein will occur to those of ordinary skill in the art without departing from the spirit and scope of the invention. While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation. The actual scope of the invention is intended to be defined in the following claims.

What is claimed is:

1. An electrode for use in a battery comprising at least one polycrystalline nanostructure, wherein the nanostructure comprises at least two metal oxide concentric shells defining an inner void, wherein the nanostructure further comprises a core within the inner void, and wherein the nanostructure has a discharge capacity of at least about 300 mAh/g after about 25 cycles.

2. The electrode of claim 1, wherein the shells are not covalently linked to each other.

3. The electrode of claim 2, wherein the nanostructure comprises two metal oxide concentric shells, wherein the shells are not covalently linked to each other.

4. The electrode of claim 1, wherein the core comprises materials selected from the group consisting of Au, Ag, Pt and Pd.

5. The electrode of claim 1, wherein the core comprises materials with magnetic properties.

6. The electrode of claim 5, wherein the materials with magnetic properties comprise Fe, Co or Ni.

7. The electrode of claim 6, wherein the materials with magnetic properties comprise ferric oxides.

8. The electrode of claim 5, wherein the materials with magnetic properties are selected from the group consisting of ZnO, CuO, and Cu2O.

9. The electrode of claim 5, wherein the materials with magnetic properties comprise metal sulfide semiconductors.

10. The electrode of claim 1, wherein at least one metal oxide shell has one or more pores.

11. The electrode of claim 1, wherein the nanostructure is spherical, cylindrical or polyhedral.

12. The electrode of claim 1, wherein the nanostructure is selected from the group consisting of nanoparticles, nanorods, nanobelts, nano-arrays, nanotubes, nanodisks, nanoboxes, nanospheres, nanocylinders, nanococoons, and nanospindles.

13. The electrode of claim 1, wherein the metal oxide comprises a metal selected from the group consisting of titanium, zirconium, aluminum, tin, gennanium, indium, gallium, hafnium, vanadium, tantalum, zinc, copper, iron, cobalt, nickel, chromium, and manganese.

14. The electrode of claim 1, wherein the average size of each crystal is between about 1.0 nm and about 50.0 nm.

15. The electrode of claim 14, wherein the average size of each crystal is between about 10.0 nm and about 20.0 nm.

16. The electrode of claim 1, wherein the average diameter of the core is between about 5.0 nm and about 500.0 nm.

17. The electrode of claim 16, wherein the average diameter of the core is between about 30.0 nm and about 300.0 nm.

18. The electrode of claim 17, wherein the average diameter of the core is between about 50.0 nm and about 150.0 nm.

19. The electrode of claim 18, wherein the corresponding ring-like selected-area electron diffraction pattern of the nanostructure reveals diffraction rings from inside to outside which are indexed to (110), (101), (200), (211), and (112) planes of rutile SnO2 respectively.

20. The electrode of claim 1, wherein the core is magnetic.

21. The electrode of claim 20, wherein the magnetic core comprises a ferric-based material.

22. The electrode of claim 21, wherein the ferric based material is a ferric oxide.

23. The electrode of claim 22, wherein the ferric oxide is $Fe_3O_4$.

24. The electrode of claim 1, wherein the core has electrical properties.

25. The electrode of claim 24, wherein the nanostructure further comprises an outermost shell comprising a semiconductor material.

26. The electrode of claim 25, wherein the semiconductor material comprises carbon black.

27. The electrode of claim 25, wherein the semiconductor material comprises a propylenevinylidenefluoride compound.

28. The electrode of claim 1, wherein the core has semiconductor properties.

29. The electrode of claim 1, wherein the core comprising noble metals.

30. The electrode of claim 29, wherein the noble metals are chosen from the group consisting of Au, Ag, Pt and Pd.

* * * * *